Aug. 28, 1945.  C. T. LUDINGTON  2,383,870
AMPHIBIAN AIRCRAFT
Filed July 6, 1942  2 Sheets-Sheet 2
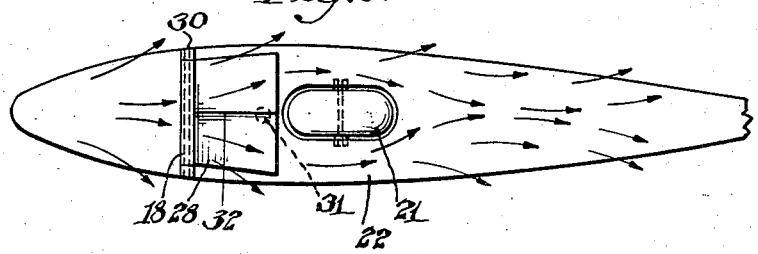
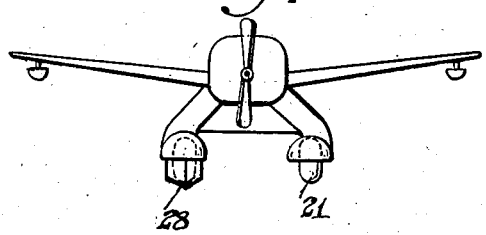
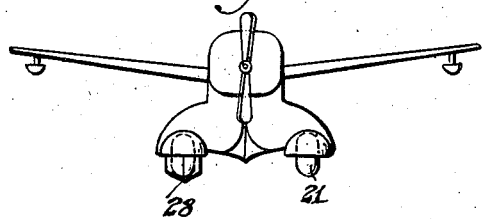
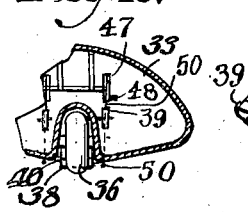
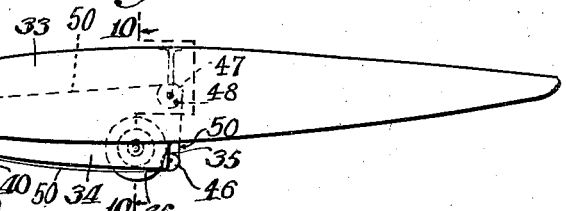
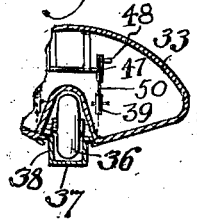
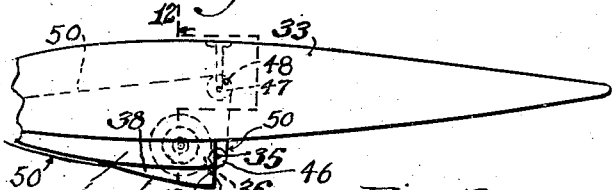
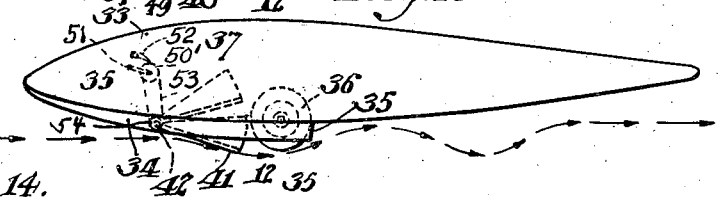
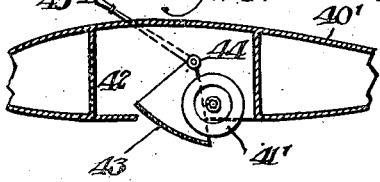
INVENTOR:
Charles Townsend Ludington,
BY Barr, Borden + Fox
ATTORNEYS.

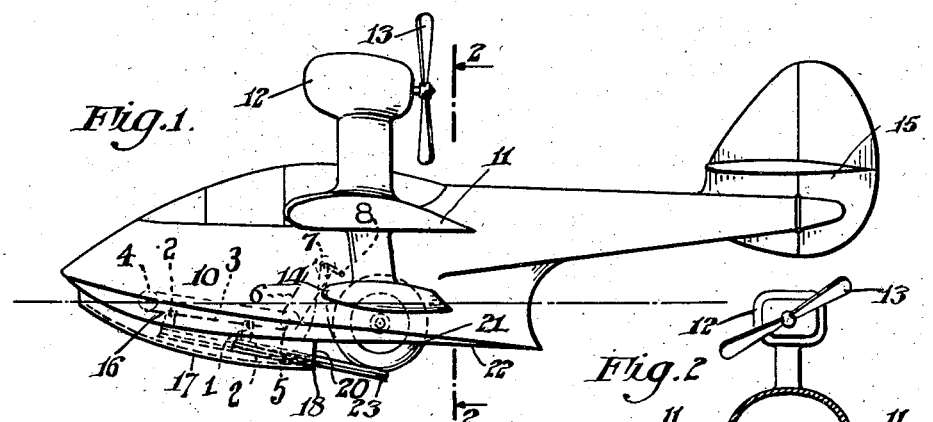

Patented Aug. 28, 1945

2,383,870

UNITED STATES PATENT OFFICE 2,383,870

AMPHIBIAN AIRCRAFT

Charles Townsend Ludington, Ardmore, Pa.

Application July 6, 1942, Serial No. 449,933

8 Claims. (Cl. 244—101)

This invention relates to amphibian aircraft.

There is a demand for a small, light and inexpensive amphibian aircraft from various sources including the military, and especially from private owners, but so far as known this demand has not yet been met nor satisfied. A major reason for the difficulties in producing such aircraft has been the weight expense and complication of the gear for retracting the landing wheels added to the factor of the weight and expense of the hull or analogous buoyant bodies in contrast to the ordinary steel tube and fabric structure of conventional fuselages. The increased weight requires greater power, and this in turn requires greater strength to stand the greater power, which again adds to the weight. It is an inefficient circle.

It is among the advantages of this invention; to obviate the difficulties of the prior art; to provide a buoyant-bodied aircraft with a substantially non-retractible landing wheel with which it is safe to land on either land or water; to provide an amphibian aircraft having a substantially non-retractible wheel and a hydroplane surface with a step for landing on or taking off from water, with means for deflecting water from the wheel in a water landing or take-off to minimize hazards arising from the exposure of the wheel; to provide a relatively small movable element arranged selectively for bridging the gap between the step and the wheel of the landing gear of an amphibian aircraft; to improve generally the art of aircraft; to provide in amphibian aircraft a movable skid arranged to bridge or extend partially between the step and the wheel to create a planing or water-diverting surface; to provide a movable skid for an amphibian having a relatively non-retractible wheel arranged to abut the wheel to transmit water landing shocks directly to the wheel; and many other objects and advantages will become more apparent as the description proceeds.

In carrying out the invention in a preferred embodiment, I provide an amphibian aircraft, the flotation member or members of which have a water contact area, with a wheel or wheels arranged non-retractibly in spaced relation to the water contact area for sustaining the aircraft on the ground in landings and take-offs, with skid means movable under the control of the pilot from within the cockpit, to either actually or effectually bridge or unbridge the space between the water contact area and the ground contacting wheel, according to the nature of the landing medium to be contacted in a landing. As an important refinement, the movable skid may be such as merely to effectively bridge the gap by providing a water diverting function, deflecting water from the wheel, or actually, by extension thereof to overlying juxtaposition to the wheel to imposition thereon, at least during landing impacts, to cause the shock absorbing mechanism for the wheel to absorb the water landing shock. The term "bridging" as used herein is intended to be generic enough to cover either actual or effectual bridging.

In the accompanying drawings:

Fig. 1 represents a schematic side elevation of an amphibian aircraft incorporating one form of the invention in a single landing wheel structure.

Fig. 2 represents a fragmentary vertical section thereof on line 2—2 of Fig. 1.

Fig. 3 represents a fragmentary schematic elevation of a modified form of bridging member shown in extended position in full lines and in retracted position in dotted lines.

Fig. 4 represents a fragmentray side elevation of an aircraft having a modified form of bridging member movable between the hydroplane step and the landing wheel, out of contact with the wheel so as merely to deflect water away from the wheel in water landings and take-offs.

Fig. 5 represents a fragmentary transverse vertical section through the device of Fig. 4 on line 5—5 thereof.

Fig. 6 represents a diagrammatic reflected or bottom plan of a sponson, pontoon or float type of the flotation body, according to Figs. 4 and 5, showing the course of flow of the water about the substantially non-retractible wheel.

Fig. 7 represents a diagrammatic front elevation of an amphibian having spaced float members such as in Fig. 6, one of which is extended to show the relation of wheel to projected skid, while the other is in elevation with the skid retracted to illustrate the two conditions of skid positioning.

Fig. 8 represents a view similar in most regards to Fig. 7 except that the relatively non-retractible wheels are shown as associated with a flying boat hull instead of sponsons or floats.

Fig. 9 represents a diagrammatic elevation of a flotation or buoyant body incorporating a modified form of the invention in which a bodily traveling or sliding step is disposed forwardly of the sponson to uncover the landing wheel for ground landings.

Fig. 10 represents a fragmentary transverse section on line 10—10 of Fig. 9.

Fig. 11 represents a similar view of the sponson of Fig. 9, with the traveling step moved into such position as to house the wheel and form the hydroplane step of the lower surface of the flotation body, at least at the keel.

Fig. 12 represents a fragmentary transverse section on line 12—12 of Fig. 10.

Fig. 13 represents a diagrammatic elevation of a flotation body incorporating a further modified form of the invention in which the water contact surface in advance of the step is formed of a vertically adjustable member to deflect water past the wheel in water landings, which is retracted as shown in dotted lines to permit the wheel to function for landing.

Fig. 14 represents a diagrammatic fragmentary elevation of a still further modified form of the invention in which the skid is retractible about a pivot into a center-board-well type of housing in the sponson or flying boat hull.

In carrying out the invention, it should be understood that it makes no real difference generically whether the flotation body comprises a flying boat hull, sponsons, pontoons, floats, or any other form of sustaining or displacement body, and wherever one form is shown, any other could be substituted, and it is to be considered as substituted without affecting the invention. Of course, if any feature later recited is peculiar to a single type of device, this will be pointed out.

Referring to Fig. 1 there is shown an amphibian aircraft having a hull 10, a wing 11, power plant 12, propeller 13, wing pontoons 14, and empennage or tail group 15. The hull illustratively has a more or less conventional V bottom 16 having a keel 17 which may be somewhat broader than usual. The keel should be at least slightly wider than the width of the landing wheel to be described. The forward portion of the V bottom terminates in a transverse step 18 as is conventional with such flying boat hulls. The step 18 is vertically closed in a riser or transom as at 20, except for a slot large enough to permit the relative sliding of a skid to be described. In the preferable form of aircraft of Figs. 1 and 2, a single, central landing wheel 21 is mounted, in rearwardly spaced relation to the step 18, symmetrical relative thereto, and is provided with the customary resilient cushioning or shock absorbing gear (not shown) but is relatively non-retractible and normally has a predetermined spacing of its tread from the bottom 22 behind the step 18.

A pilot controlled skid 23 is mounted slidably within the keel 17 of V bottom 16, normally disposed forwardly of the step 18 and arranged to be projected rearwardly through the step riser 20 to underly and preferably to contact the tread of wheel 21, so that the wheel is protected by a planing surfacing in landing upon water. In effect, the extended skid forms a prolongation of the keel to partially house the wheel. Obviously, the skid need not be as narrow as shown and may be wider than the keel 17, so as to form the major part of step 18 when desired.

Obviously, it does not need to be so formed as to completely house the wheel, as the principal danger in piling water up in front of the wheel in a take-off or landing is substantially at planing speeds. If the wheel later becomes immersed while the aircraft is stationary or moving slowly on water, it does not present any particular difficulties. In general, however, all of the skid devices disclosed herein effect a partial or substantial housing of the wheel. Obviously, for ground landings, the skid 23 is retracted into the widened keel 17 and a normal landing on the ground is permitted. With the thin skid 23 shown, the space requirements and structural reenforcements necessary for mounting and operating same are very small, especially as the shocks of landing loads are transmitted directly through the thin skid into the wheel 21, whereby the shock absorbing gear of the latter can function for water landings as well as for ground landings.

In the embodiment shown in Figs. 1 and 2, a single landing wheel is shown which probably will contribute to the lightness and cheapness of the aircraft and is perfectly feasible and operative with the addition of skids (not shown) on the wing tip floats 14. As will be pointed out, these same principles maintain in the multi-wheel type of landing gear, and the form of skids illustrated herein in connection with single wheels is also to be considered as applied respectively to a plurality of wheels. Although a single skid may be mounted for multiple wheel use, it is preferred to have individual skids for each respective wheel.

Any desired guiding and actuating means may be used for advancing and retracting the skid. For instance, there may be provided complemental transversely spaced track portions (not shown) inside of the keel 17, to guide one end of the skid, at least, in its movement from one position to the other. A yoke 1 may be rigidly or otherwise mounted on the inner end of the skid 23, the crossbar of which is pivotally connected as at 2, to the endless cable or chain 3 extending about pulleys 4 and 5, and driven by the cable 6 extending about driving pulley or power wheel 7 and pulley 5. Pulley or wheel 7 is controlled by a suitable crank or power unit 8. Rotation of crank 8 and wheel 7 drives chain 3 in one direction or the other and through links or arms comprising yoke 1 it drags the skid 23 into or out of keel 17 to the respective dotted and full line positions shown.

In the form of invention of Fig. 3, everything is the same as has been previously described of Figs. 1 and 2, except the manner of supporting and projecting the skid. In this form the skid 25 is mounted pivotally upon a pair of pivoted links respectively 26 and 27, so that from a retracted position within the keel of unappreciable protuberance through the step, the skid 25 can easily be projected rearwardly to bridge the gap between the step 18 and the wheel 24.

Link 26 is keyed to wheel 9 engaged by a chain or the like 19 driven by power wheel 29, and its operation will be clear.

In the form of invention shown in Figs. 4, 5 and 6 the flying boat construction is similar to that which has already been described, but the space between the step 18 and wheel 21 is only effectively or partially bridged by the provision of a trough-like skid 28 pivoted just inside the step as at 30 and controlled as, for instance, by a rotatable threaded shank 31 passing through a nut 29' in the lower surface of the hull and rotatable relative to the skid and arranged for predetermined angular relation to the keel and to the wheel 21 by pilot controlled rotation of shaft 31. This, illustratively, may be by means of a pilot rotated shafting and gearing train 24. In making ground landings, the skid 28 is retracted to the dotted line position to permit freedom of landing. For landing on or taking off from water, the skid is moved to the full line position shown, to form a combined planing and water diverting member juxtaposed in front of the wheel 21. In this connection, it is to be noted that the lower surface of the hinged skid 28 has a median ridge 32 from which the surface is inclined laterally and rearwardly so as to cause a resultant flow of water on each side about and under the wheel 21 such as is indicated by arrows in Fig. 6. In this construction, the effective ridge operates to throw the water laterally and rearwardly and downwardly of the wheel in a manner such as to prevent the water drag of the wheel from becoming effective at planing speeds. Obviously, the power to operate a device of this kind is inappreciable and can easily be accomplished by a small hydraulic motor or gear, or even by manually imposed torque.

Fig. 7 represents a type of aircraft having water sustentation by means of sponsons such as are disclosed in the United States Patent to Apel, No. 2,126,304, or of the conventional twin float design, (in a rather inoperative position for purposes of illustration only) with the skid shown extended under one wheel so as to deflect or divert water therefrom while the other one is in condition for landing on ground, which, as noted, is usually an undesired combination of facilities and is shown purely for illustrative purposes. Fig. 8 shows the application of the bridging skid to a conventional flying boat with twin landing wheels and with one wheel effectively bridged to the skid or step for illustrative purposes only.

The invention involves still a further important modification as illustrated in Figs. 9 to 12 inclusive. In these figures, a buoyant body 33 has a lower planing surface 34 preferably including a keel and terminating in a step 35 (at least as wide as the keel) and the non-retractible wheel 36 projects out of the bottom of the planing surface 34 forwardly of step 35. The secondary planing surface or auxiliary keel 37 is formed on a box-like structure 38 having a rear step 40 and arranged to be slid longitudinally of the buoyant body from the forward position shown in Fig. 9, where it is out of the way so that landings of the wheel on ground are facilitated, to the rearward position shown in Fig. 11, in which it houses the lower depending portion of the wheel 36, to completely bridge the wheel to facilitate water landings. The auxilliary keel may be substantially keel-width or may be as wide as the lower surface 34, to form the complete step of the body. Among other advantages of this simplified structure is the fact that operating control may be secured by mechanism disposed completely externally of the buoyant body, such as by pulleys, cables and the like, thus avoiding the weight of internal gear or the likelihood of leakage that may attach to other forms of control. It will be understood, also, that the step 40 on the box 38 wil be suitably recessed or apertured to permit the box to pass over and about the wheel 36.

In a simplified form of control it is preferred to have some portion inside of the pontoon or buoyant body as well as some outside. Illustratively, the body has one and preferably a pair of pulleys 39 in the entering edge, a similar pair of pulleys 46 in the step 35, and a pair of internal driven pulleys 47 actuated by a crank arm, as 48. The sliding step 38 has a pair of cable connectors 49 to which cables 50 are respectively attached and from which they extend about pulleys 46, 47 and 39, to attachment toward the forward end of step 37. Rotation of wheel 47 by power or by crank 48 will slide the step 37 to the positions indicated in the respective Figs. 9 to 11.

It will be understood that any of the actuating devices may be disposed in wells or other housings or suitably packed so as to keep the buoyant bodies water-tight and the inner portions thereof relatively free from space consuming gear.

In the modified form shown in Fig. 13, the same buoyant body 33 having the surface 34, step 35 and wheel 36 is provided with a pivoted vane or skid 41 pivoted at 42 and arranged to be retracted to the dotted lines shown, or to be extended below the line of the body 33 so as to deflect the water from the wheel 36. The course of the water to the surface to the buoyant body 33, in a water landing or water take-off is indicated in the arrows Fig. 13. A power wheel 50' driven by a crank 51 releasably locked by a pawl 52 through cable 53 effective on a wheel 54 keyed to the pivotal shaft 42 of skid 41, may be used to actuate the device of Fig. 13.

In the further modified form of the invention shown in Fig. 14, the buoyant body 40' having wheel 41' is provided with a well 42' in the lower surface. The substantially arcuate skid or deflector 43 is pivoted at 44 within the well controlled by the external handle 45, for instance, and is arranged to be swung downwardly to a position such as to deflect the water from the wheel 41', or selectively to be retracted to permit the landing wheel 41' to function.

The advantages of the invention will be obvious.

Having thus described my invention, I claim:

1. In aircraft, a landing wheel, a water landing surface, and skid means effectively slidable from a retracted position out of contact with the wheel to an effectively extended position underlying and in contact with the wheel bridging between the wheel and water landing surface to permit landing of the aircraft on water without retraction of the wheel and arranged so that water landing shocks are transmitted to the wheel for absorption thereby.

2. In aircraft, a landing gear comprising a wheel, a water landing surface terminating in spaced relation to the wheel so as to permit landings upon the wheel, and means effectively slidably movable relative to the wheel into transversely abutting engagement with said wheel to prevent water from piling up in front of the wheel at planing speeds and to transmit water landing shocks directly to said wheel through the slidable means.

3. In aircraft, a landing gear comprising a substantially fixed non-retractible wheel, a water landing surface terminating in spaced relation to the wheel so as to permit landings upon the wheel, and effectively slidable means movable from a retracted position relative to the wheel to prevent water from piling up in front of the wheel at planing speeds, said means arranged to overlie transversely and abut against the surface of the wheel to transmit water landing shocks thereto.

4. In aircraft, a buoyant body having a relatively non-retractible landing wheel extending from the lower surface thereof, and means comprising a plate-like member having a forward portion and a trailing edge movable to substantially house the exposed portion of the wheel during landing on water with the forward portion merging into and forming a substantially unbroken continuation of the surface of the body and with the trailing edge forming a hydroplane type step for landing on and take-off from water.

5. In aircraft, a buoyant body having a relatively non-retractible landing wheel extending from the lower surface thereof, and means movable to substantially house the exposed portion of the wheel during landing on water, said last mentioned means rectractible to expose the wheel for landing on ground, said means comprising a substantially wedge-shaped member mounted for longitudinal sliding movement on the lower surface of said body.

6. In aircraft, a buoyant body having a relatively non-retractible landing wheel extending from the lower surface thereof, and means movable to substantially house the exposed portion of the wheel during landing on water, said last mentioned means retractible to expose the wheel for landing on ground, said means comprising a substantially wedge-shaped member mounted for longitudinal sliding movement on the lower surface of said body, said wedge having the pointed end extending toward the bow of the aircraft and so arranged when disposed in wheel-housing relation that the blunt end thereof functions in part at least as a hydroplane step.

7. In aircraft, a landing gear comprising a buoyant body having water contact surfaces and forming a housing having an opening, a wheel mounted non-retractibly in the body to extend from the lower surface thereof for landing on ground and disposed in juxtaposition to said opening, means effectively slidable arranged to be projected from the housing to extend between the water contact surface and the wheel in transversely abutting contact with the wheel, so that the shocks incident to water landings or water take-offs are transmitted directly to said wheel.

8. In aircraft, a landing gear comprising a buoyant body having water contact surfaces, a wheel mounted non-retractibly in the body to extend from the lower surface thereof for landing on ground, means in the buoyant body defining a well, and a skid device having a forward portion and a trailing edge and arranged for disposition in the well and projectible therefrom into water-diverting landing step forming relation to said wheel, said skid device mounted on a pivot eccentric to but mounted above the level of the axis of said wheel so that in its projection it abuts transversely against the wheel to transmit water landing shocks thereto, and said skid device having a profile different from that of the wheel and so shaped that it is substantially tangential thereto and the forward portion thereof merges substantially into the surface of the body, whereby the trailing edge forms a hydroplane type step in its projected position.

CHARLES TOWNSEND LUDINGTON.